Oct. 8, 1929.    G. W. FISHER    1,730,497
VALVE
Filed May 26, 1927    3 Sheets-Sheet 1
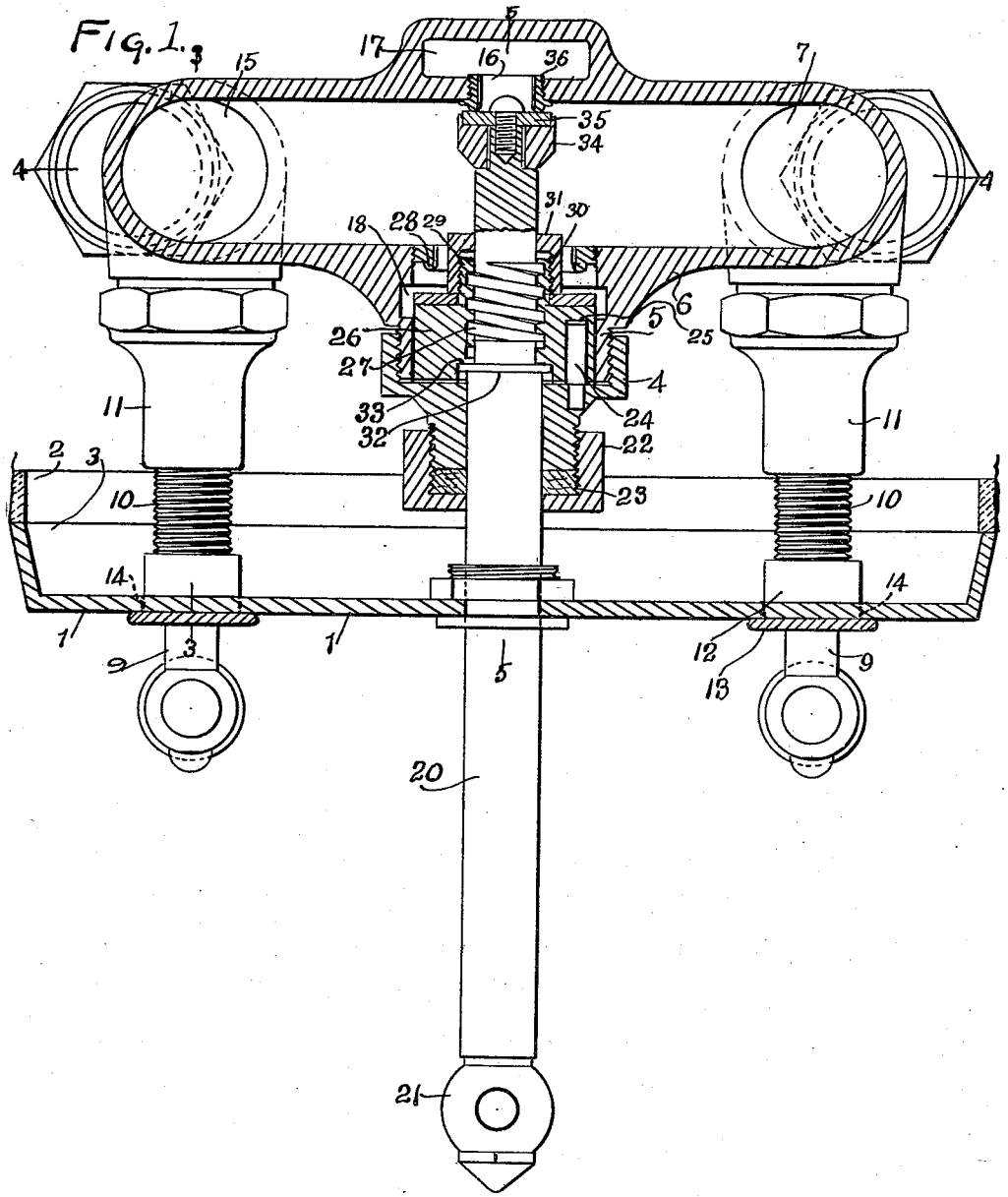
Inventor
GEORGE W. FISHER, Oct. 8, 1929.   G. W. FISHER   1,730,497
VALVE
Filed May 26, 1927   3 Sheets-Sheet 2
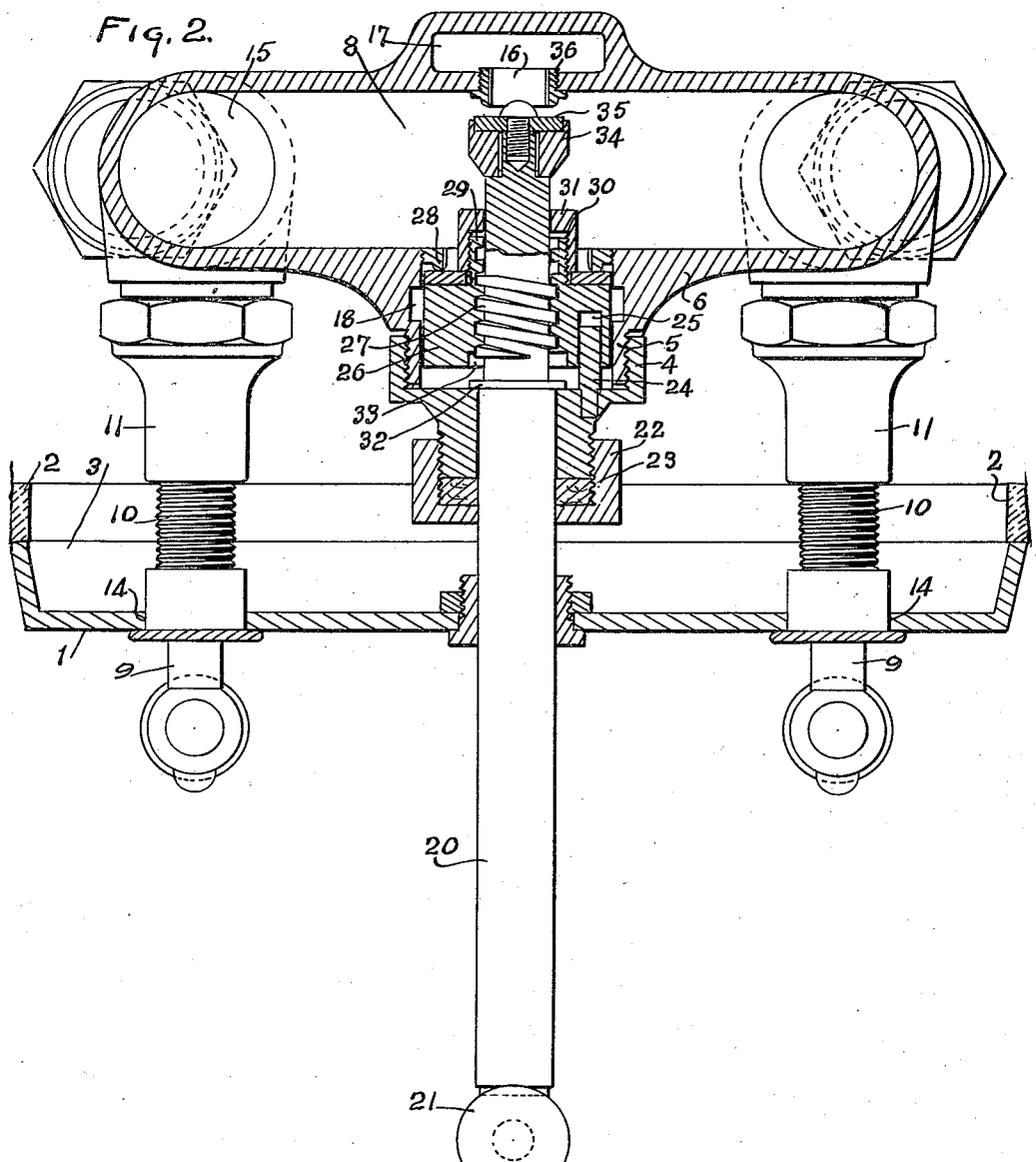
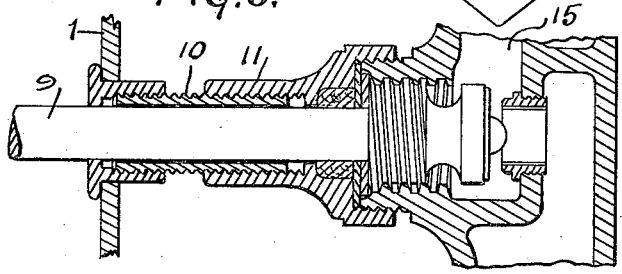
Inventor
GEORGE W. FISHER,
By Toulmin & Toulmin,
Attorneys.

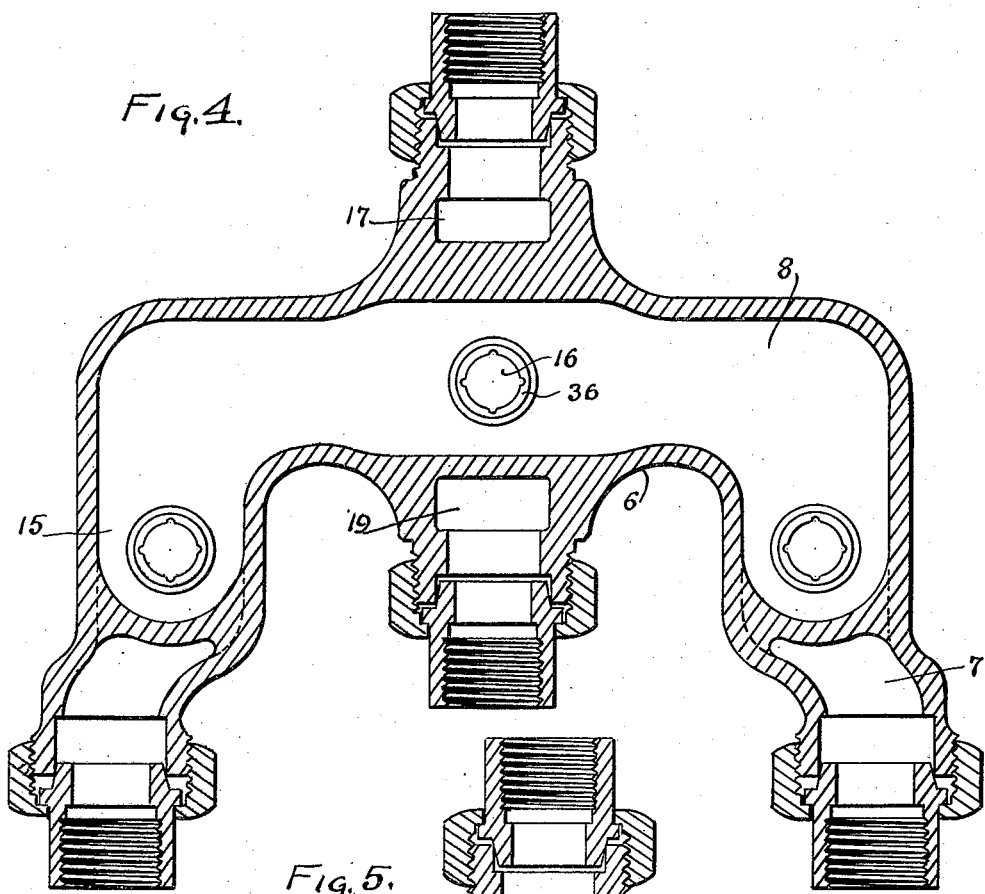
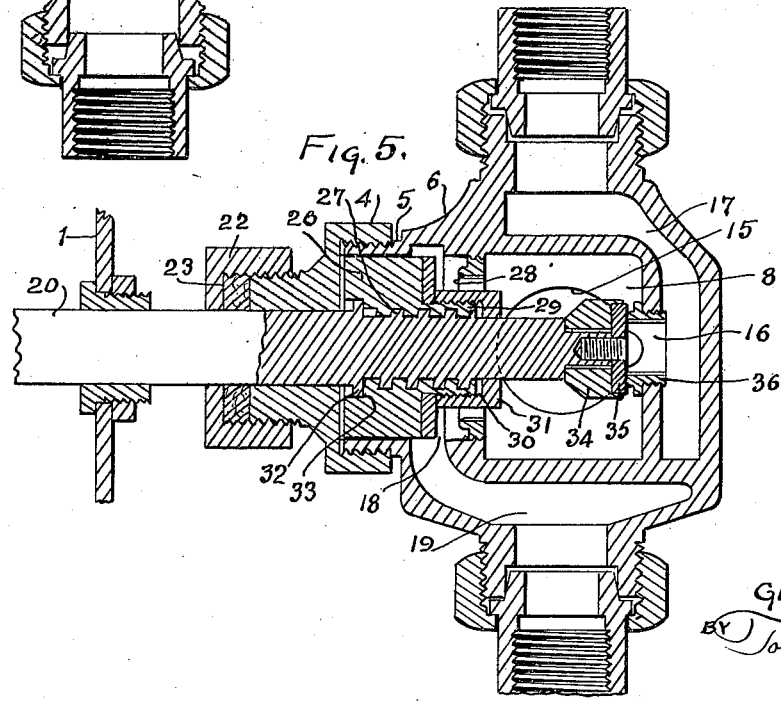

Patented Oct. 8, 1929

1,730,497

UNITED STATES PATENT OFFICE

GEORGE W. FISHER, OF MARYSVILLE, OHIO, ASSIGNOR TO THE FISHER BRASS COMPANY, OF BELLEFONTAINE, OHIO, A CORPORATION OF OHIO

VALVE

Application filed May 26, 1927. Serial No. 194,459.

My invention relates to valves.

It is the object of my invention to provide a fixture for controlling with a single handle the directing of water to a tub or shower and for providing for the mixing of hot and cold water for such tub or shower in a mixing chamber in the fixture.

It is my object to provide a very large mixing chamber relative to the entire fixture so that complete mixing may be secured, irrespective of the speed or pressure of the water. It is a further object of this fixture to eliminate springs and the like.

It is my object to provide means of simultaneously opening and closing two valves with a single handle and a single movement. It is a further object to provide a fixture in which such valve mechanism may be removed bodily from the fixture without the necessity of disturbing the fixture.

It is an additional object of providing means of spacing the fixture from a face plate carried on the tile wall in such a manner that the fixture may be adjusted to any distance from the tile wall to the fixture and to any depth of wall.

Referring to the drawings:

Figure 1 is a section through the fixture with the shower valve closed and the tub valve open.

Figure 2 is a similar view with the shower valve open and the tub valve closed.

Figure 3 is a section on the line 3—3 of Figure 1, showing the adjustable feature between the plate and the fixture.

Figure 4 is a section on the line 4—4 of Figure 1.

Figure 5 is a section on the line 5—5 of Figure 1.

Referring to the drawings, it will be understood that this fixture is of just the size to fit between two studdings and is so arranged as to be adaptable to such a compact location. It is also relatively shallow so that it can be installed in a narrow space in a thin wall. The opening through which the fixture is inserted in the wall is closed by a single plate, designated 1, engaging with the tile wall 2. Thus the entire fixture may be moved through the opening 3 in the wall when the plate 1 is removed, but if it is not desired to remove the fixture the valve mechanism, hereinafter described, may be moved outwardly by detaching a single screw collar 4 mounted on the threaded sleeve 5 of the fixture casing 6.

The casing 6 is provided with a hot water inlet passageway 7 emptying into the mixing chamber 8. Such passageway is controlled by a valve member, the stem generally designated 9, of any desired character. On the stem is mounted a threaded spacing sleeve 10 threaded into the bearing sleeve 11 carried on the casing 6 and carrying at its outer end the internally threaded sleeve 12 having the bezel 13 fitting on the outer face of the plate 1. This exteriorly smooth sleeve 12 fits within the opening 14 in the plate 1 to receive it. The distance between the plate and the fixture may be adjusted by threading the sleeve 10 into sleeve 12 to suitable positions. If the sleeve 10 is too long it can be cut off by a plumber.

Returning to the fixture proper, a similar construction is found on the left-hand of the fixture for the cold water which enters through the passageway 15 into the mixing chamber 8. The mixed fluid from the chamber 8 may either pass upwardly to the shower through the port 16 into the shower passageway 17 or it may pass through the port 18 into the tub passageway 19. The valve members for controlling these passageways 16 and 18 are arranged as follows: The control shaft 20 having a handle 21 is loosely mounted in a threaded sleeve 4. A packing sleeve 22 is mounted on the exterior of the sleeve 4 and retains in position a packing 23. This sleeve 4 carries an interiorly disposed pin 24, which projects into a passageway 25 in the tub valve 26. This tub valve is threaded upon the threads 27 of the shaft 20. The tub valve 26 cannot rotate due to the pin 24, but it can reciprocate being guided in its reciprocation by pin 24. The rotation of the shaft 20 and screw 27 will cause this reciprocation of the tub valve 26 and cause it to either engage or disengage the tub valve seat 28 opening and closing the port 18.

The tub valve member 26 is provided with sleeve 29 externally threaded at 30, on which is mounted a sealing sleeve 31 to prevent leakage.

The shaft 20 is provided with a limiting shoulder 32 which is adapted to engage with the interiorly disposed shoulder 33 of the tub valve member so as to co-operate in limiting its movement.

The end of the shaft 20 is provided with a shower valve member 34 having a resilient washer face 35 engaging with the shower valve seat 36. The valve member 34 is swivelly mounted on the inner end of the shaft 20 so that when the valve is seated the valve member 34 remains stationary when the valve shaft rotates as is necessary for the operation of the tub valve. It is moved to engaging and disengaging positions by reason of the screw 27 of the shaft 20 working within the tub valve member 26 which, when held in a stationary position relative to any rotating movement by reason of the pin 24, will provide the proper thread for causing this movement through the shaft 20 of the shower valve member 24.

It will be understood that I desire to comprehend within my invention such modifications as may be necessary to adapt it to varying conditions and uses.

Having thus fully described my invention, what I claim as new and desire to secure by Letters Patent, is:

1. In a fixture, a mixing chamber having a shower port and a tub port, an actuating shaft, a tub valve member threaded on said shaft, means to prevent the rotation of said valve member but to permit its reciprocation by the shaft, and a rotating shower valve member carried on said shaft.

2. In a fixture, a mixing chamber having a shower port and a tub port, an actuating shaft, a tub valve member threaded on said shaft, means to prevent the rotation of said valve member but to permit its reciprocation by the shaft, a rotating shower valve member carried on said shaft, a shoulder on said shaft adapted to engage with a shoulder on said casing and a shoulder on the tub valve member.

3. In a fixture, a housing containing a mixing chamber, tub and shower passageways connected by ports to the mixing chamber, a non-rotating reciprocating tub valve member closing the tub port and a rotating reciprocating valve member controlling the shower port and a common actuating shaft upon which the shower valve member is fixedly mounted and upon which the tub valve member is threaded.

4. In a fixture, a housing containing a mixing chamber, tub and shower passageways connected by ports to the mixing chamber, a non-rotating reciprocating tub valve member closing the tub port and a rotating reciprocating valve member controlling the shower port, a common actuating shaft upon which the shower valve member is fixedly mounted and upon which the tub valve member is threaded, said shaft being supported in a closure member of sufficient size for the removal of the tub valve member with the shaft and said tub valve port being of sufficient size to permit the withdrawal with the shaft of the shower valve member whereby said shaft and valve members may be withdrawn as a unit.

5. In a fixture, an actuating shaft rotatable and loosely mounted in a casing, a casing having a mixing chamber, tub and shower passageways connected with the mixing chamber by ports, a tub valve member threaded upon said shaft, a pin carried by said casing projecting into said tub valve member which reciprocates on said pin and is prevented from rotating by it and a shower valve member adapted to turn with the shaft, being fixedly mounted thereon.

6. In a fixture, an actuating shaft rotatable and loosely mounted in a casing, a casing having a mixing chamber, tub and shower passageways connected with the mixing chamber by ports, a tub valve member threaded upon said shaft, a pin carried by said casing projecting into said tub valve member which reciprocates on said pin and is prevented from rotating by it and a shower valve member adapted to turn with the shaft, being fixedly mounted thereon, said tub valve member being cut away adjacent one end on the exterior thereof for receiving a flanged portion of said shaft.

7. In combination in a fixture of a casing, a shaft in said casing, a sleeve mounted on said casing internally threaded, an externally mounted sleeve mounted in the internal sleeve spaced from said shaft but surrounding it and a supplementary retaining collar having a smooth exterior, a retaining flange and a threaded interior mounted on said exteriorly threaded sleeve whereby the distance between said flange and said fitting may be adjustable for locating the fitting with respect to a cover plate on the wall, in which the fitting is located.

8. In a fixture, a casing having a mixing chamber, a shower passageway on one side connected with the mixing chamber by a port, a tub passageway on the other side connected by a port with the mixing chamber, said ports being in line, a detachable cap member forming one side of the tub passageway in the casing, an actuating shaft loosely mounted in said cap, an internally extending pin parallel to said shaft mounted on said cap, a tub valve member adapted to close the tub port adapted to reciprocate on said pin and thread, on said shaft engaging an interior thread of said valve member to reciprocate it, a packing member mounted on said shaft and said valve member adjacent the inner ends of the thread thereof for preventing leakage through the threads to the exterior of the fixture, the diameter of said thread packing member being less than the diameter of the tub port and adapted to reciprocate therethrough, and a spaced shower valve member carried by said shaft adapted to control the shower port.

In testimony whereof, I affix my signature.

GEORGE W. FISHER.